United States Patent [19]

Kempler

[11] 4,128,306

[45] Dec. 5, 1978

[54] OPTICAL MAGNIFYING DEVICE

[76] Inventor: Fred Kempler, 5, avenue Maurice Barres, La Varenne, Val de Marne, France

[21] Appl. No.: 745,604

[22] Filed: Nov. 29, 1976

[30] Foreign Application Priority Data

Jan. 26, 1976 [FR] France .............................. 76 02056

[51] Int. Cl.² ............................................. G02B 27/02
[52] U.S. Cl. .................................... 350/239; 350/245
[58] Field of Search .................................. 350/37–39, 350/85, 238, 239, 245, 252, 254, 257; 35/19 B

[56] References Cited

U.S. PATENT DOCUMENTS 3,551,022   12/1970   Yamasaka et al. ..................... 350/85

FOREIGN PATENT DOCUMENTS 649186   1/1951   United Kingdom ..................... 350/254

Primary Examiner—F. L. Evans
Attorney, Agent, or Firm—Woodard, Weikart, Emhardt & Naughton

[57] ABSTRACT

The present invention concerns an optical magnifying device consisting of a block having at least two holes at right angles in the same plane, these two holes which pass right through the block each having close to one end of the hole, a magnifying lens whose focal point is approximately at the level of the other end of the hole.

4 Claims, 3 Drawing Figures

OPTICAL MAGNIFYING DEVICE

The invention concerns an optical magnifying device.

The invention is characterised by the fact that the device is constituted by a block having at least two perpendicular holes in the same plane, these two holes which pass right through the block each having, close to one end of the hole, a magnifying lens whose focal point is approximately at the level of the other end of the hole.

According to another characteristic of the invention the block has, at right angles to each other, three holes whoses axes meet in a point.

According to another characteristic of the invention the block is spherical in shape.

The invention is shown purely as an example which is in no way limiting in the accompanying drawings in which.

Figure 1:
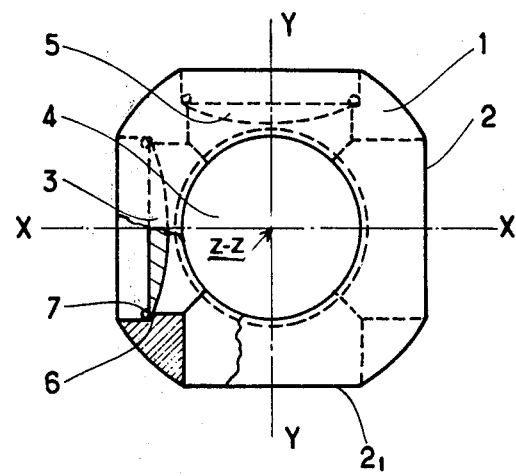
FIG. 1 is a partly exploded view of one form of the device covered by the invention.

The device according to the invention comprises a metal or plastic block, in the example shown in FIG. 1 attached, is made in the shape of a sphere.

This bloc is pierced, in this example, by three holes with axes X — X, Y — Y and Z — Z at right angles to each other and cutting each other at one and the same point. The sphere 1 with its three holes at right angles which pass right through it has six openings which where they cut the outer surface of the sphere delimit plane surfaces 2 which allow the block to sit in stable fashion on a flat surface.

In accordance with the invention each of these holes with axes X — X, Y — Y and Z — Z carries close to one of its openings, a glass converging lens 3, 4 or 5 whose position within the hole as well as its focal length are determined so as to allow it to act as a magnifier of objects located at the position of the opening diametrically opposite to the lens.

Thus, in the example shown in FIG. 1 and supposing the block 1 to be supported on a surface by the periphery of hole 2, it will be seen that lens 5 constitutes with block 1 a magnifier whose position with reference to hole $2_1$, is preset so as to produce a bundle of parallel rays so permitting a magnified view of the surface on which the block is resting.

It will be noted that, in this design, the user has three magnifiers of different strengths to view objects, the position of each lens being preset with reference to the opposite opening of the same hole so that lenses and hence the magnification may very easily and quickly be changed to suit the object being viewed.

In addition, with this device, it will be seen that the surface being examined through the lens is illuminated from the four openings of the other two adjoining holes at right angles. When using this magnifier it is therefore not necessary to turn the block to find an angular position giving maximum illumination of the surface being examined since, of the four adjacent openings there is always one which is largely pointing in this direction of maximum illumination.

The lens may be located close to one of the openings of each hole by any required means and, in the example shown in FIG. 1 each of the holes with axes X — X, Y — Y and Z — Z has a peripheral shoulder against which rests one of the lenses such as 3, this lens being held in this position by a ring 7. This may be a split ring locating in a groove of corresponding size formed close to shoulder 6.

Figure 2:
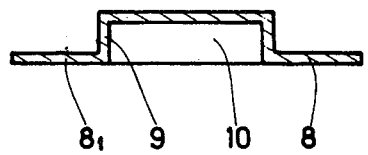
FIG. 2 is a sectional view of a base to hold living creatures for examination.

According to the invention, this ring may be also associated with a base which allows both support for the block as well as examination in magnified view of small animals. This base 8, (see FIG. 2) is made of transparent material and has a flat lower face $8_1$ and an upper face which is shaped at 9 to fit into the openings 2 which are not carrying lenses. Thus if the holes with axes X — X, Y — Y and Z — Z are circular, the upper face of base 8 has a protruding portion 9 which is cylindrical and whose diameter is approximately the same as that of the holes.

This base 8 is hollow and the hollow portion opens into the lower face $8_1$ of the base in such a way that a small animal may be held captive within this hollow portion 10.

Lens 3, 4 or 5 situated on the same axis thus allow a magnified view of the animal held captive.

Figure 3:
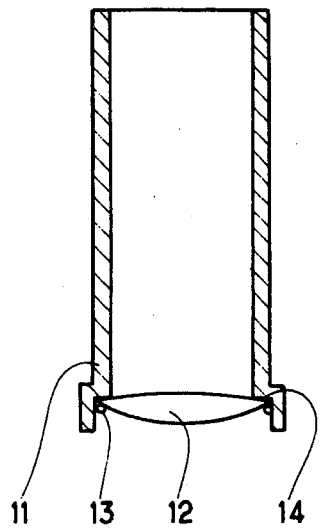
FIG. 3 is a sectional view of a method of transforming the device into a telescope.

According to the invention, block 1 with its lenses 3, 4 or 5 may also be used with a device so as to give a telescope assembly. This arrangement (see FIG. 3) is made up of a sleeve 11 whose shape and exterior dimensions match those of the holes in block 1 so that it is a sliding fit into those openings of the holes which do not carry a lens. This sleeve 11 is fitted near one of its ends with a lens 12 in such a way that it may be used with the lens on the same axis of block 1 to form a telescope which may be focussed by adjusting the position of sleeve 11 by sliding it in or out and thus controlling the distance of lens 12 from the lens situated on the same axis of block 1.

This lens 12 close to one of sleeve 11 can be fixed by any known means and as an example, may be held in the same way as in the case of lens 3, 4 and 5 by means of a ring 13 retaining the lens 12 up against an annular shoulder 14 on the inner face of the sleeve.

Naturally, the invention is not limited to the examples described above and illustrated here, from which it would be possible to develop other types and other shapes without these falling outside the scope of the invention.

I claim:

1. An optical magnifying device wherein there is an autonomous block carrying three perpendicular perforations extending completely through the block the axes of which intersect at a point and carry magnifying lenses, enlarged recesses at one of the ends of each of said perforations and coaxial with the perforations, said recesses each being adapted to receive a transparent base wherein the object to be studied is located.

2. A device as claimed in claim 1, wherein the various lenses arranged in the perforations of the block have various magnifying powers.

3. A device as claimed in claim 1 in which said transparent base takes the form of a cup-shaped member having a planar lower face and an upper face shaped to fit within said recesses in said block perforations, the planar lower face of the cup-shaped member being adjacent the outer terminus of the recess when the member is inserted therein.

4. A device as claimed in claim 1 but including a casing shaped and sized so as to be slidable into a selected one of said perforations, said casing carrying a lens constituting a telescope with the lenses of the block.

* * * * *